(12) United States Patent
Parchami et al.

(10) Patent No.: US 11,783,707 B2
(45) Date of Patent: Oct. 10, 2023

(54) VEHICLE PATH PLANNING

(71) Applicant: Ford Global Technologies, LLC, Dearborn, MI (US)

(72) Inventors: Mostafa Parchami, Dearborn, MI (US); Juan Enrique Castorena Martinez, Southfield, MI (US); Enrique Corona, Canton, MI (US); Bruno Sielly Jales Costa, Santa Clara, CA (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 973 days.

(21) Appl. No.: 16/155,048

(22) Filed: Oct. 9, 2018

(65) Prior Publication Data

US 2020/0111358 A1   Apr. 9, 2020

(51) Int. Cl.
*G08G 1/0967*  (2006.01)
*G05D 1/02*  (2020.01)
(Continued)

(52) U.S. Cl.
CPC ........ *G08G 1/096783* (2013.01); *G01S 17/42* (2013.01); *G01S 17/931* (2020.01); *G05D 1/0231* (2013.01); *G05D 1/0276* (2013.01); *G06N 20/00* (2019.01); *G08G 1/04* (2013.01); *G08G 1/052* (2013.01); *G08G 1/056* (2013.01); *G08G 1/096708* (2013.01);
(Continued)

(58) Field of Classification Search
CPC .... G08G 1/096783; G08G 1/04; G08G 1/052; G08G 1/056; G08G 1/096708; G08G 1/164; G08G 1/166; G06N 20/00; G01S 17/931; G01S 17/42; G05D 1/0231; G05D 1/0276; G05D 2201/0213
See application file for complete search history.

(56) References Cited

U.S. PATENT DOCUMENTS

| 5,706,417 A | 1/1998 | Adelson |
| 5,787,199 A | 7/1998 | Lee |

(Continued)

FOREIGN PATENT DOCUMENTS

| CN | 102201121 A | 9/2011 |
| CN | 101582160 B | 9/2013 |

(Continued)

OTHER PUBLICATIONS

Dmitry Kangin, (Feb. 2016). Intelligent Video Surveillance. Data Science Group School of Computing and Communications Lancaster University England, (1-172) (Year: 2016).*

(Continued)

*Primary Examiner* — James M McPherson
*Assistant Examiner* — Bakari Underwood
(74) *Attorney, Agent, or Firm* — Frank A. MacKenzie; Bejin Bieneman PLC (57) ABSTRACT

A computing system can receive, in a vehicle, moving object information is determined by processing lidar sensor data acquired by a stationary lidar sensor. The moving object information can be determined using typicality and eccentricity data analysis (TEDA) on the lidar sensor data. The vehicle can be operated based on the moving object information.

20 Claims, 7 Drawing Sheets

(51) Int. Cl.
*G08G 1/04* (2006.01)
*G08G 1/052* (2006.01)
*G08G 1/16* (2006.01)
*G08G 1/0968* (2006.01)
*G01S 17/42* (2006.01)
*G08G 1/056* (2006.01)
*G06N 20/00* (2019.01)
*G01S 17/931* (2020.01)

(52) U.S. Cl.
CPC ....... *G08G 1/096805* (2013.01); *G08G 1/164* (2013.01); *G08G 1/166* (2013.01); *G05D 2201/0213* (2013.01)

(56) References Cited

U.S. PATENT DOCUMENTS

| | | |
|---|---|---|
| 6,580,812 B1 | 6/2003 | Harrington |
| 6,956,469 B2 | 10/2005 | Hirvonen et al. |
| 7,149,328 B2 | 12/2006 | Kamijo et al. |
| 7,418,113 B2 | 8/2008 | Porikli et al. |
| 7,710,461 B2 | 5/2010 | Nagano et al. |
| 7,881,497 B2 | 2/2011 | Ganguli et al. |
| 7,920,959 B1 | 4/2011 | Williams |
| 8,094,943 B2 | 1/2012 | Eaton et al. |
| 8,120,661 B2 | 2/2012 | Rabinowitz et al. |
| 8,328,653 B2 | 12/2012 | Lock |
| 8,379,926 B2 | 2/2013 | Kanhere et al. |
| 8,611,593 B2 | 12/2013 | Chen et al. |
| 8,718,327 B2 | 5/2014 | Tong et al. |
| 8,947,529 B2 | 2/2015 | Strine et al. |
| 9,171,390 B2 | 10/2015 | Summer et al. |
| 9,300,871 B2 | 3/2016 | Zhou et al. |
| 9,418,320 B2 | 8/2016 | Chang et al. |
| 9,542,626 B2 | 1/2017 | Martinson et al. |
| 9,558,424 B2 | 1/2017 | Ramalingam et al. |
| 9,665,804 B2 | 5/2017 | Sarkis et al. |
| 9,716,832 B2 | 7/2017 | Ryu et al. |
| 9,756,248 B1 | 9/2017 | Wu et al. |
| 9,804,713 B2 | 10/2017 | Guarneri et al. |
| 9,854,168 B2 | 12/2017 | Wu et al. |
| 10,055,850 B2 | 8/2018 | Piekniewski et al. |
| 10,059,334 B1* | 8/2018 | Zhu .................. G05D 1/0214 |
| 10,535,127 B1 | 1/2020 | Simonson et al. |
| 10,705,525 B2 | 7/2020 | Smolyanskiy et al. |
| 10,769,799 B2 | 9/2020 | Jales Costa et al. |
| 11,253,953 B1 | 2/2022 | Jiang et al. |
| 2002/0041339 A1 | 4/2002 | Diepold |
| 2004/0076324 A1 | 4/2004 | Burl et al. |
| 2008/0195316 A1 | 8/2008 | Krishnaswamy |
| 2014/0218555 A1 | 8/2014 | Kuo et al. |
| 2015/0003676 A1 | 1/2015 | Kuchiki |
| 2015/0310274 A1 | 10/2015 | Shreve et al. |
| 2015/0339589 A1 | 11/2015 | Fisher |
| 2016/0125245 A1 | 5/2016 | Saitwal et al. |
| 2016/0125621 A1 | 5/2016 | Saitwal et al. |
| 2016/0173787 A1 | 6/2016 | Yun |
| 2016/0180177 A1* | 6/2016 | Nguyen ............. G06K 9/00798 382/104 |
| 2016/0236790 A1 | 8/2016 | Knapp et al. |
| 2016/0292882 A1 | 10/2016 | Comport et al. |
| 2016/0300357 A1* | 10/2016 | Boon .................. G06T 7/143 |
| 2017/0053554 A1 | 2/2017 | Nalepka et al. |
| 2017/0053555 A1 | 2/2017 | Angel et al. |
| 2017/0193312 A1* | 7/2017 | Ai .................. G06K 9/4652 |
| 2017/0206717 A1 | 7/2017 | Kuhnapfel |
| 2017/0236252 A1 | 8/2017 | Nguyen et al. |
| 2017/0242442 A1* | 8/2017 | Minster .................. G06T 7/32 |
| 2017/0358119 A1 | 12/2017 | Forutanpour et al. |
| 2018/0024562 A1 | 1/2018 | Bellaiche |
| 2018/0074176 A1* | 3/2018 | Feng .................. G01S 17/42 |
| 2018/0218214 A1 | 8/2018 | Pestun et al. |
| 2019/0079535 A1 | 3/2019 | Zhu et al. |
| 2019/0086925 A1* | 3/2019 | Fan .................. B60W 30/00 |
| 2019/0114491 A1 | 4/2019 | Takaki |
| 2019/0271767 A1* | 9/2019 | Keilaf .................. G01S 7/4815 |
| 2019/0286153 A1 | 9/2019 | Rankawat et al. |
| 2019/0364403 A1* | 11/2019 | Abari .................. H04W 4/40 |
| 2020/0053286 A1 | 2/2020 | Corona et al. |
| 2020/0065663 A1 | 2/2020 | Singh et al. |
| 2020/0065978 A1 | 2/2020 | Jales Costa et al. |
| 2020/0065980 A1 | 2/2020 | Jales Costa et al. |
| 2020/0111358 A1 | 4/2020 | Parchami et al. |
| 2020/0116836 A1* | 4/2020 | Pacala .................. G01J 3/0216 |
| 2020/0142421 A1 | 5/2020 | Palanisamy et al. |
| 2020/0189573 A1 | 6/2020 | King et al. |
| 2020/0293064 A1 | 9/2020 | Wu et al. |
| 2020/0380763 A1 | 12/2020 | Abramov |
| 2020/0394917 A1 | 12/2020 | Jales Costa et al. |
| 2020/0409385 A1 | 12/2020 | Chakravarty et al. |

FOREIGN PATENT DOCUMENTS

| | | |
|---|---|---|
| CN | 102592112 B | 1/2014 |
| CN | 103077531 B | 11/2015 |
| CN | 106952474 A | 7/2017 |
| CN | 108230367 A | 6/2018 |
| CN | 110737834 A | 1/2020 |
| CN | 110858316 A | 3/2020 |
| CN | 111986128 A | 11/2020 |
| CN | 112146618 A | 12/2020 |
| DE | 102019122402 A1 | 2/2020 |
| DE | 102020113848 A1 | 11/2020 |
| WO | 2016108847 A1 | 7/2016 |
| WO | 2017206999 A1 | 12/2017 |
| WO | 2018170393 A9 | 9/2018 |

OTHER PUBLICATIONS

Angelov, "Outside the Box: An Alternative Data Analytics Framework", Journal of Automation, Mobile Robotics & Intelligent Systems, Vo. 8, No. 2, 2014.

Angelov, "Outside the Box: An Alternative Data Analytics Framework", Journal of Automation, Mobile Robotics & Intelligent Systems, vol. 8, N° 2, 2014.

Chen et al., "Object-Based Features for House Detection from RGB High-Resolution Images", Remote Sens. 2018, 10, 451; doi: 10.3390/rs10030451, www.mdpi.com/journal/remotesensing.

Kim et al., "Foreground Objects Detection by U-Net with Multiple Difference Images", Appl. Sci. 2021, 11, 1807. https://doi.org/10.3390/app11041807, https://www.mdpi.com/journal/applsci.

Nister et al., "Visual Odometry for Ground Vehicle Applications", published in Journal of Field Robotics, Jan. 26, 2006 (35 pages).

Wang et al., "An Optimization Clustering Algorithm Based on Texture Feature Fusion for Color Image Segmentation", Algorithms 2015, 8, 234-247; doi: 10.3390/a8020234, ISSN 1999-4893, www.mdpi.com/journal/algorithms.

The 20BN-jester Dataset V1, retrieved from Internet URL: https://20bn.com/datasets/jester (6 pages).

Notice of Allowance dated Jun. 2, 2022; U.S. Appl. No. 16/421,563, filed May 24, 2019.

Non-Final Office Action dated Jul. 26, 2022; Appl. No. 16/456,192, filed Jun. 28, 2019.

Notice of Allowance dated Jul. 27, 2022; U.S. Appl. No. 16/437,292, filed Jun. 11, 2019.

Yanpeng Cao, Vehicle Ego-Motion Estimation by using Pulse-Coupled Neural Network, 2007, University of Manchester (Year: 2007).

S. Sridhar, Vision Based Tunnel Detection For Driver Assitance System, 2014, Mando Softtech India Pvt. Ltd (Year: 2014).

Hayakawa, Ego-motion and Surrounding Vehicle State Estimation Using a Monocular Camera, 2019, 2019 IEEE Intelligent Vehicles Symposium (Year: 2019).

Notice of Allowance dated Jan. 31, 2023 re U.S. Appl. No. 16/456,192, filed Jun. 28, 2019.

* cited by examiner

VEHICLE PATH PLANNING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate vehicle on a roadway in traffic including other vehicles. Based on sensor data, a computing device can determine a safe path for a vehicle to travel to reach a destination on a roadway in the presence of other vehicles and objects such as pedestrians, where a path is defined as a line connecting successive locations of a vehicle as it moves from a first location on a roadway to a second or destination location on a roadway.

A vehicle can also receive information to operate a vehicle on a roadway in traffic including other vehicles from a traffic infrastructure system, where a traffic infrastructure system can be server computers, referred to as "edge" or "fog" that forms ad hoc networks with vehicles via V-to-I networks that include vehicles based on their geographic location. Traffic infrastructure networks can be based on cell phone towers and cell phone networks or network interfaces installed along roadways and Wi-Fi networks, for example. Traffic infrastructure systems can include sensor that can determine foreground/background data based on stationary lidar sensor data and transmit the foreground/background information to vehicles based on the vehicles geographic location.

Disclosed herein is a method, including receiving, in a vehicle, moving object information determined by processing lidar sensor data acquired by a stationary lidar sensor and processed using typicality and eccentricity data analysis (TEDA), and operating the vehicle based on the moving object information. The stationary lidar sensor can acquire lidar sensor data in sequential columns from left to right and transmits the lidar sensor data to a traffic infrastructure computing device which processes the lidar sensor data in columns as they are acquired, whereby portions of the moving object data are received in the vehicle before the stationary lidar sensor has completed acquiring lidar sensor data. TEDA can include processing the stationary lidar sensor data to determine a pixel mean and a pixel variance over a moving time window and combining current pixel values with pixel mean and pixel variance to determine foreground pixels based on eccentricity.

Determining moving objects information is based on determining connected regions of foreground pixels in a foreground/background image formed by TEDA. Determining moving object information in the foreground/background images can include tracking connected regions of foreground pixels in a plurality of foreground/background images. Moving object information can be projected onto a map centered on the vehicle based on a 3D lidar sensor pose and lidar sensor field of view and a 3D vehicle pose. Operating the vehicle can include determining a polynomial function that includes predicted vehicle trajectories, wherein predicted vehicle trajectories include location, direction, speed, and lateral and longitudinal accelerations. determining the polynomial function can include determining a destination location on the map. Determining the polynomial function can include avoiding collisions or near-collisions with moving objects. Determining the polynomial function can include staying within lower and upper limits on latitudinal and longitudinal accelerations. 3D vehicle pose can be based on vehicle sensor data including GPS and INS. The map can be determined based on combining map data downloaded from a server computer with vehicle sensor data. The moving objects can be out of the fields of view of vehicle sensors.

Further disclosed is a computer readable medium, storing program instructions for executing some or all of the above method steps. Further disclosed is a computer programmed for executing some or all of the above method steps, including a computer apparatus, programmed to receive, in a vehicle, moving object information determined by processing lidar sensor data acquired by a stationary lidar sensor and processed using typicality and eccentricity data analysis (TEDA), and operating the vehicle based on the moving object information. The stationary lidar sensor can acquire lidar sensor data in sequential columns from left to right and transmits the lidar sensor data to a traffic infrastructure computing device which processes the lidar sensor data in columns as they are acquired, whereby portions of the moving object information are received in the vehicle before the stationary lidar sensor has completed acquiring lidar sensor data. TEDA can include processing the stationary lidar sensor data to determine a pixel mean and a pixel variance over a moving time window and combining current pixel values with pixel mean and pixel variance to determine foreground pixels based on eccentricity.

The computer apparatus can be programmed to operate the vehicle including determining moving object information based on determining connected regions of foreground pixels in a foreground/background image formed by TEDA. Determining moving object information in the foreground/background image can include tracking connected regions of foreground pixels in a plurality of foreground/background images. Moving object information in the foreground/background image can be projected onto a map centered on the vehicle based on a 3D lidar sensor pose and lidar sensor field of view and a 3D vehicle pose. Operating the vehicle can include determining a polynomial function that includes predicted vehicle trajectories, wherein predicted vehicle trajectories include location, direction, speed, and lateral and longitudinal accelerations. determining the polynomial function can include determining a destination location on the map. Determining the polynomial function can include avoiding collisions or near-collisions with moving objects. Determining the polynomial function can include staying within lower and upper limits on latitudinal and longitudinal accelerations. 3D vehicle pose can be based on vehicle sensor data including GPS and INS. The map can be determined based on combining map data downloaded from a server computer with vehicle sensor data. The moving objects can be out of the fields of view of vehicle sensors.

Figure 1:
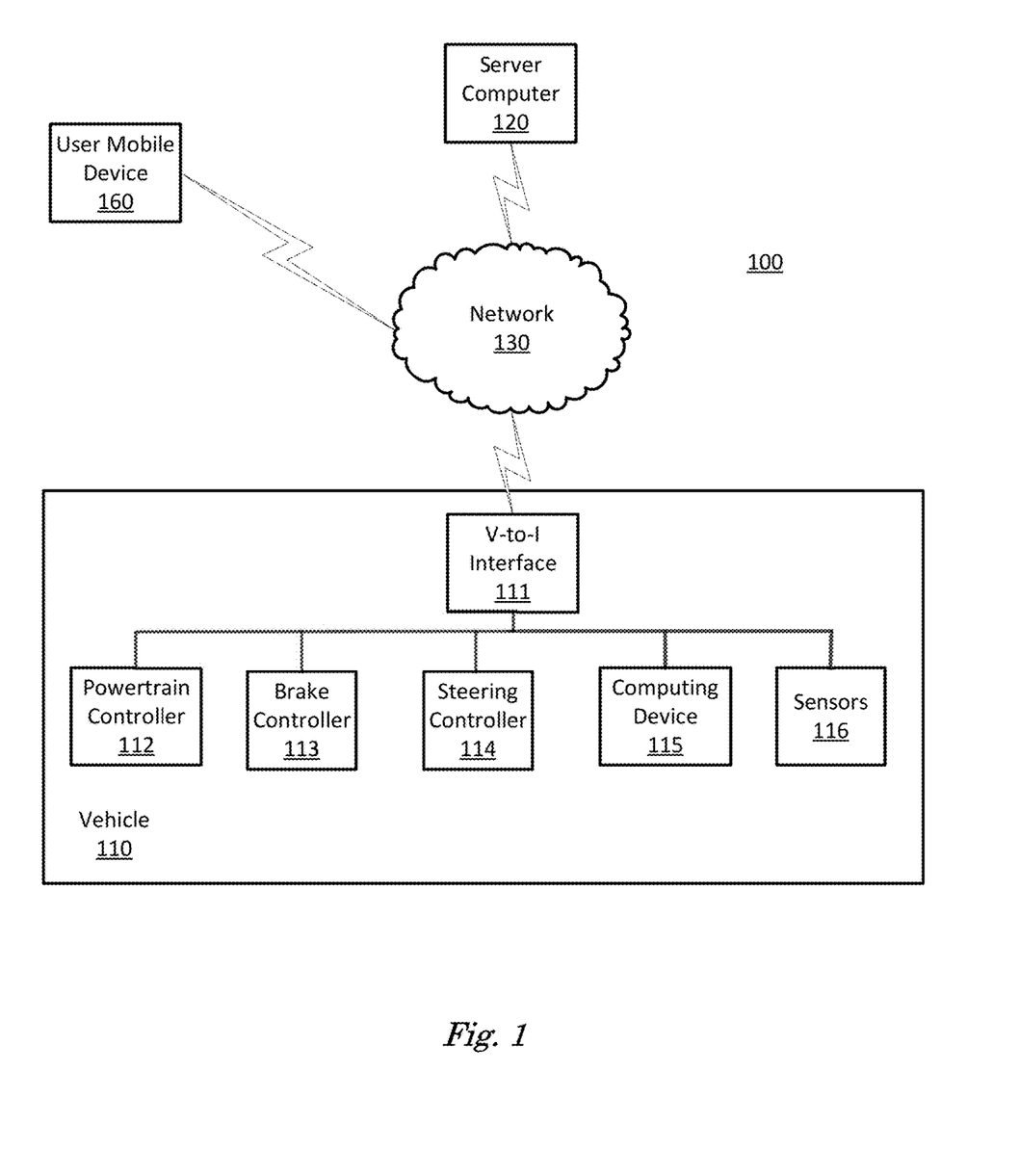
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include conventional electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
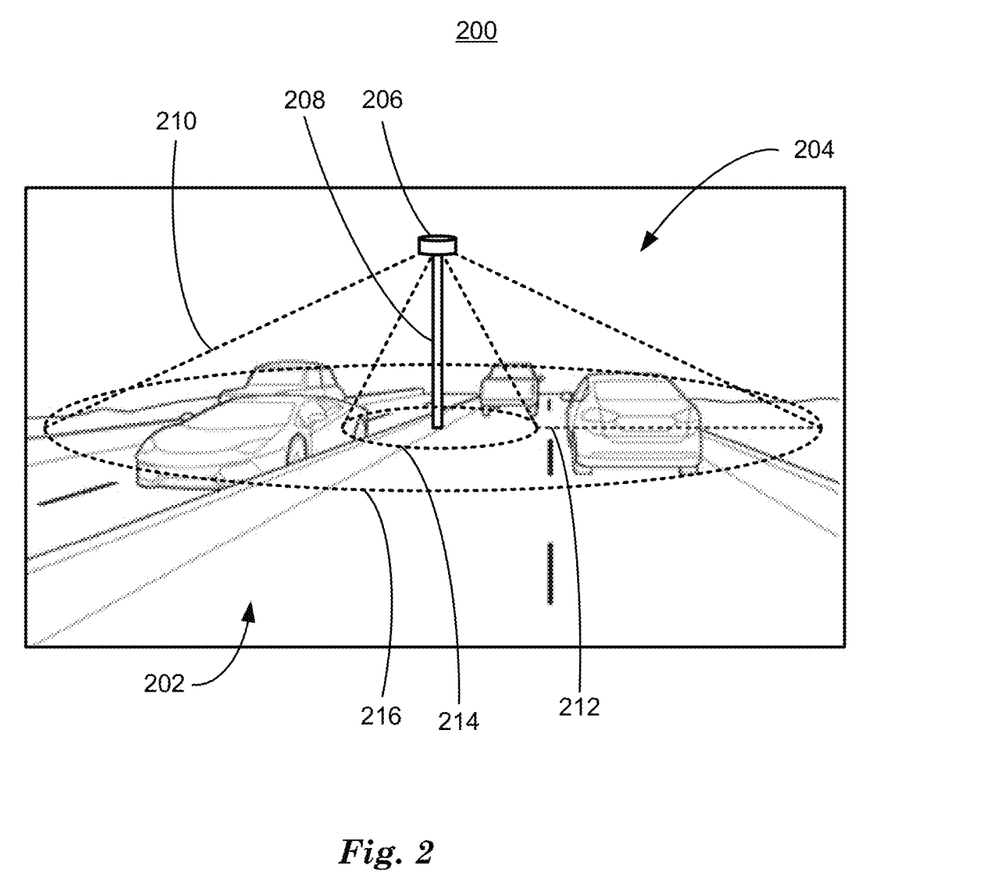
FIG. 2 is a diagram of an example traffic scene including a stationary lidar sensor.

FIG. 2 is a diagram of an example traffic scene 200 including a roadway 202, vehicles 204, and a stationary lidar sensor 206, mounted on a pole 208. Stationary lidar sensor 206 can be included in a traffic infrastructure system 100, wherein stationary lidar sensor 206 can communicate with server computer 120 via a network to transmit lidar sensor data acquired by stationary lidar sensor 206 to server computer 120 for processing and transmission to vehicle 110 via an infrastructure-based network 130. Stationary lidar sensors 206 can operate by transmitting an infrared (IR) pulse and measuring the time of flight or the time for a pulse to reflect off surfaces in the environment and return to the stationary lidar sensor 206. The direction in which the pulse is transmitted can be scanned over a field of view 210 indicated by dotted lines, wherein a plurality of lasers are aligned in a linear array so as to emit IR pulses along a line 212 between an inner diameter 214 and an outer diameter 216. In this example 32 lasers are arranged in a linear array to each emit pulses that intersect line 212. The linear array of lasers can be scanned radially within the field of view 210 while pulsing in sequence to produce range measurements for surfaces in the field of view as lidar sensor point cloud data in concentric circles around field of view 210 between inner diameter 214 and outer diameter 216, wherein the point cloud data includes data points corresponding to roadway 202 and vehicle 204 surfaces, for example.

Stationary lidar sensor 206 can determine its real world 3D pose, with respect to map data, where real world 3D pose is the 3D location in x, y, and z spatial coordinates and roll, pitch and yaw rotational coordinates with respect to a real world 3D coordinate system like latitude, longitude and altitude, and map data can be a 2D diagram of the environment around the stationary lidar sensor 206, like GOOGLE™ maps, for example. Map data can be downloaded from a server computer 120 in communication with stationary lidar sensor 206 as part of a traffic infrastructure system 100. Stationary lidar sensor 206 can determine its real world 3D pose based on sensors included in the stationary lidar sensor 206, such as GPS, for example, or can be measured in the real world and downloaded to stationary lidar sensor 206 from a server computer 120. The real world 3D pose of stationary lidar sensor 206 can be used by computing device 115 in vehicle 110 to determine the location of objects like roadways 202 and vehicles 204 with respect to a vehicle 110 in lidar sensor image data received by computing device 115 based on locations of the objects in field of view 210.

Figure 3:
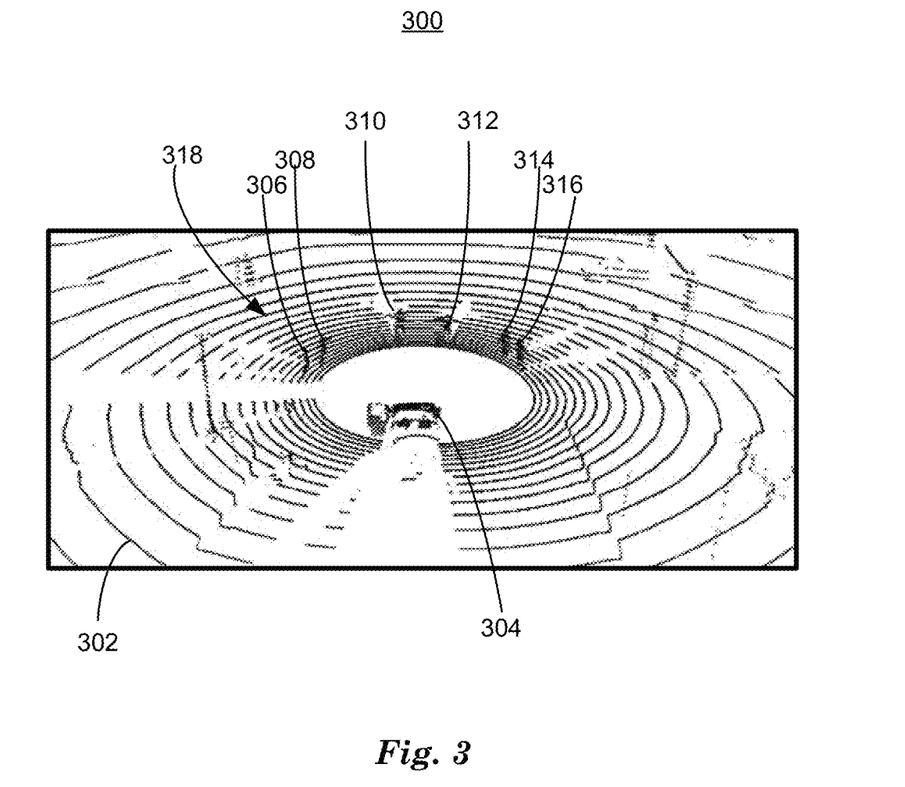
FIG. 3 is a diagram of example stationary lidar sensor data.

FIG. 3 is a diagram of example lidar image data (or lidar image) 300. In lidar image 300, point cloud data acquired by a stationary lidar sensor 206 is displayed as concentric circles 302, where each concentric circle 302 includes the point cloud data points acquired in response to pulses from a single laser. The point cloud data points acquired by a stationary lidar sensor 206 sample the environment around the stationary lidar sensor 206 by measuring distances to surfaces in the environment along concentric circles 302. Lidar image 300 includes point cloud data points corresponding to a vehicle 304 and objects (e.g., pedestrians) 306, 308, 310, 312, 314, 316, indicated collectively and individually by the reference numeral 318. The stationary lidar sensor 206 that acquired the point cloud data points included in lidar image 300 was located on a pole 208 located in the center of lidar image 300 in the center of the concentric circles 302. Locating a stationary lidar sensor 206 in a position to observe vehicle and pedestrian traffic on or near a roadway can provide information regarding vehicle and objects such as pedestrian traffic to a traffic infrastructure system 100 where the information can be communicated with a vehicle 110 to provide information to assist a computing device 115 in operating vehicle 110. Information communicated with vehicle 110 can include information regarding moving objects in the environment around vehicle 110, where the moving objects can include vehicles, pedestrians and animals, for example.

Figure 4:
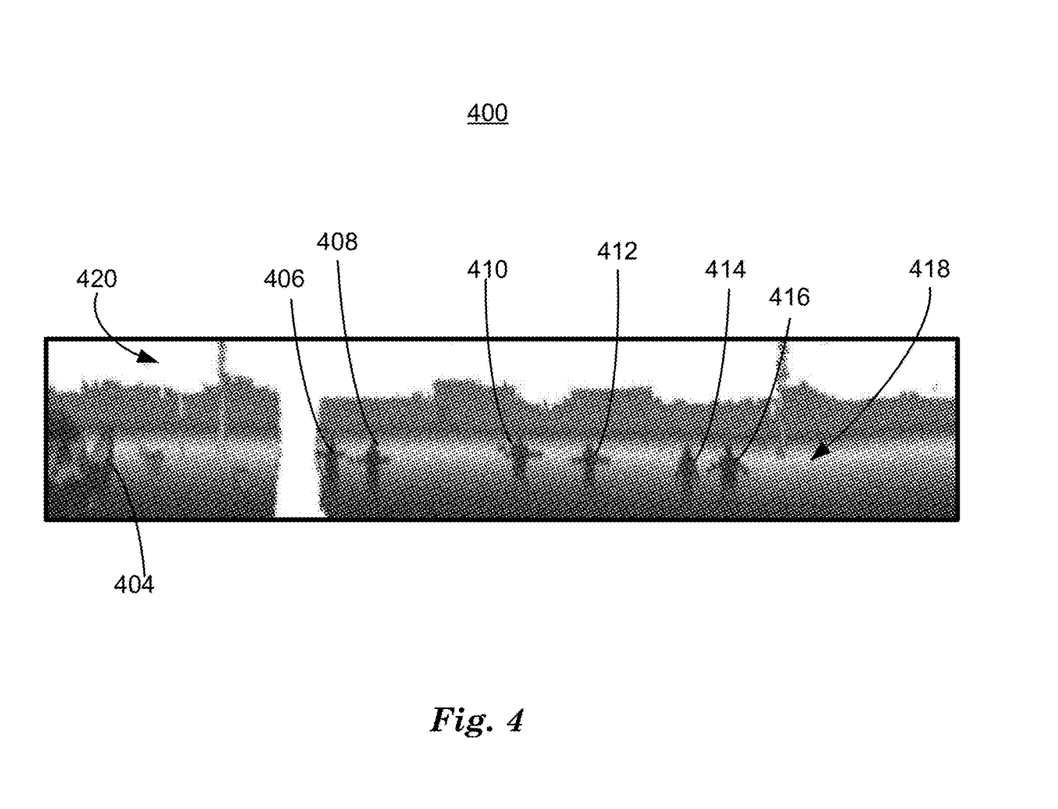
FIG. 4 is a diagram of example stationary lidar sensor data.

FIG. 4 is a diagram of an example unrolled lidar image 400. In this context "unrolled" means the lidar sensor point cloud data is displayed in a 2D array as opposed to being displayed as concentric rings as in FIG. 3. An unrolled lidar image 400 is lidar sensor point cloud data arranged in a 2D array wherein columns (y-axis) correspond to angular displacement of a linear array of lasers, rows (x-axis), channels that correspond to individual lasers in the linear array of lasers included in stationary lidar sensor 206 and pixel values are range or distance from stationary lidar sensor 206. Included in unrolled lidar image 400 are pixels representing a vehicle 404 and objects 408, 410, 412, 414, 416, indicated collectively and individually by the reference numeral 418. Blank spaces 420 correspond to missing data, wherein stationary lidar sensor was not able to reliably estimate the range or distance to a surface in the environment. Based on a sequence of unrolled lidar image 400 range map representations of point cloud data, moving objects can be detected by changes in pixel values. For a specific row and column location, those subtle changes can be considered anomalies occurring across time. Techniques described herein use typicality and eccentricity data analysis (TEDA) to detect those anomalies associated with moving objects. TEDA will be discussed in relation to FIG. 5, below. Using TEDA to detect moving objects can improve operation of a vehicle 110 by providing a technique that is highly efficient and is based on input pixel data rather than relying on user input parameters. Processing detected moving objects from a plurality of unrolled lidar image 400 can permit computing device 115 to determine location, speed and direction for moving objects using machine vision techniques to determine geometric properties of connected regions of pixels corresponding to moving objects in a plurality of TEDA output images, for example.

Figure 5:
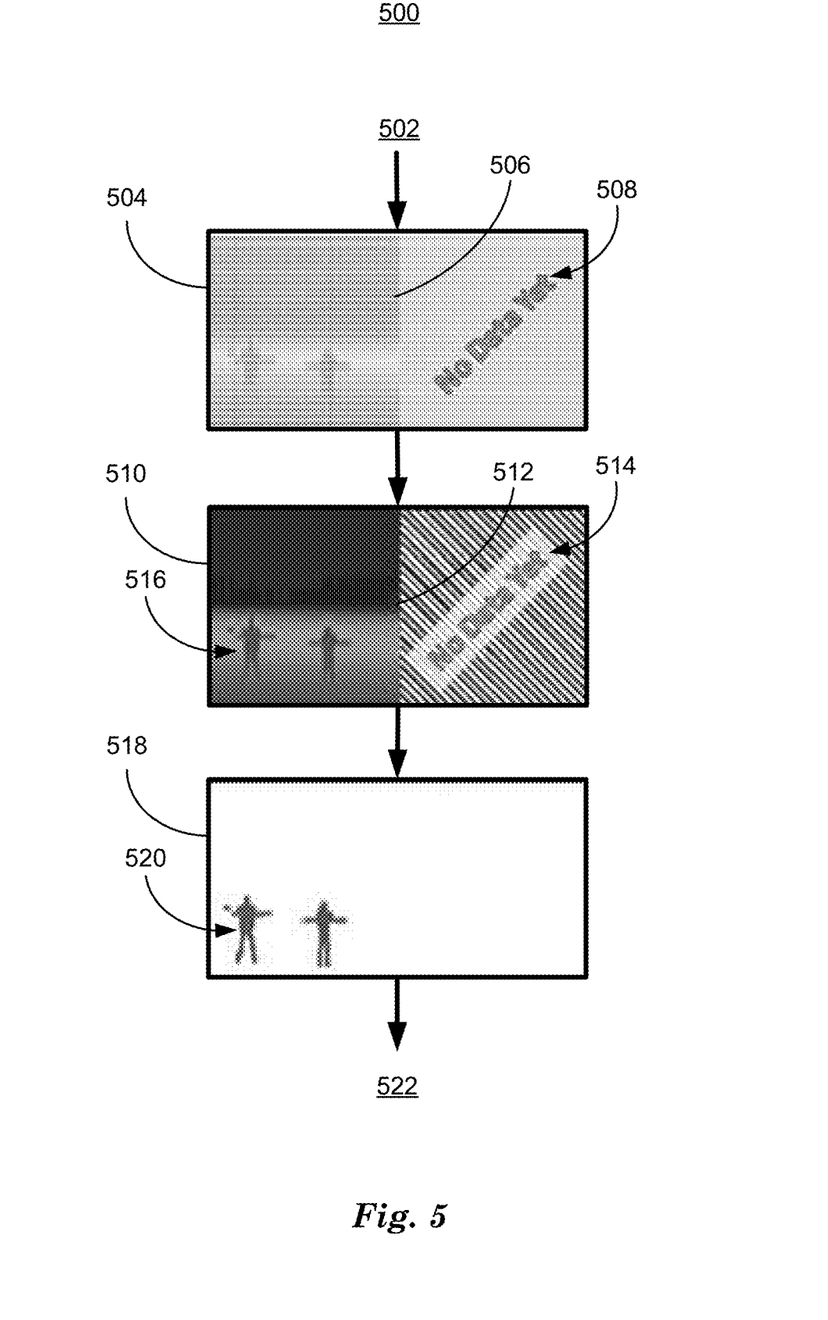
FIG. 5 is a diagram of example stationary lidar sensor data processing.

FIG. 5 is a diagram of example TEDA processing 500 applied to stationary lidar sensor point cloud data 502 acquired into an unrolled lidar image 504. Stationary lidar sensor point cloud data 502 is acquired in columns corresponding to fixed angular samples as stationary lidar sensor 206 scans the linear array of lasers while emitting and measuring IR pulses. Pixel data corresponding to lidar sensor point cloud data 502 is available for processing as soon as the column is acquired. Acquired pixel data 506 includes the columns of lidar sensor point cloud data 502 acquired by stationary lidar sensor 206 at an intermediate time between a time the scan started and a time the scan ends. To the right of acquired pixel data 506 is empty data area 508, marked "No Data Yet", because at the intermediate time stationary lidar sensor 206 has not yet acquired point cloud data 502 corresponding to the pixels of the empty data area. Because TEDA processing is based on individual pixel history over a finite time, each column of pixels of lidar sensor point cloud data can be processed as soon as it is acquired.

TEDA output image 510 illustrates the results of performing TEDA processing on acquired pixel data 506 from unrolled lidar image 504. TEDA processing includes determining a value for the eccentricity $\varepsilon$, of a pixel based on a current value for the pixel compared to a mean $\mu_k$ and a variance $\sigma_k^2$ determined based on previously acquired values for that pixel location in unrolled lidar images 504. Eccentricity $\varepsilon$ computation can be based on a moving window (finite memory) approach to recursive calculation of the eccentricity $\varepsilon$ to adapt eccentricity $\varepsilon$ for real-time processing of lidar sensor data streams. The mean $\mu_k$ and a variance $\sigma_k^2$ are recursively updated for pixels $x_k$ at a time k by the equations:

$$\mu_k = (1-\alpha)\mu_{k-1} + \alpha x_k \qquad (1)$$

$$\sigma_k^2 = (1-\alpha)\sigma_{k-1}^2 + \frac{\alpha(x_k - \mu_k)^T(x_k - \mu_k)}{1-\alpha} \qquad (2)$$

where $\alpha$ is an empirically determined constant learning rate for the background model (=0.05). The constant $\alpha$ can be used to assign a set of exponentially decreasing weights to the pixels $x_k$:

$$W = [\alpha\alpha(1-\alpha)^{k-1}\alpha(1-\alpha)^{k-2} \ldots \alpha(1-\alpha)^{k-K+1} \ldots] \qquad (3)$$

where the weight function W has unit sum. The weight function W forms a weighted average type aggregating operator with exponentially decreasing weights that depend upon $\alpha$. The elements of W with power greater than K approach zero defining a moving window of width K. The width of moving window K is approximately reciprocal to a forgetting factor equal to K≈(1/$\alpha$).

The expression for eccentricity $\varepsilon$ can be defined for all data samples up to the time instant k. However, by introducing a constant learning rate, the effect of the older data points (beyond K) is essentially eliminated. Therefore, eccentricity $\varepsilon$ can be expressed by the following approximation:

$$\varepsilon_k \approx \frac{1}{K} + \frac{(x_k - \mu_k)^T(x_k - \mu_k)}{K\sigma_k^2} \approx \alpha + \alpha\frac{(x_k - \mu_k)^T(x_k - \mu_k)}{\sigma_k^2} \qquad (4)$$

For stationary lidar sensor stream data, $x_k^{i,j} = D_k^{i,j}$, the vector containing the distance or range channels of a pixel (i, j) of an image with dimensions i rows and j columns at time instant k. Each pixel (i,j) of the image generates an input vector $x_k^{i,j}$, resulting i*j eccentricity $\varepsilon$ outputs (the eccentricity $\varepsilon$ of each pixel is independent from the other pixels, so each pixel is treated as a separate data stream). For each input unrolled lidar image 504, we can generate a TEDA output image 510. TEDA output image 510 includes processed pixel data 512, processed by applying equation 5 to each pixel of acquired pixel data 506. Empty output data area 514, marked "No Data Yet", is empty because empty data area 508 has no data to input to equation 5 at the intermediate time when the TEDA output image is calculated. Processed pixel data 508 includes foreground objects 516, Foreground/background image 518 includes connected regions of foreground pixels corresponding to moving objects 520, formed by thresholding pixels of output data area 514 by retaining only pixels with a calculated eccentricity $\varepsilon$ value greater than five times $\alpha$, the learning rate constant. The remaining pixels become background pixels. Techniques discussed herein improve operation of a vehicle 110 by providing moving objects 520 from a stationary lidar sensor 206 to a vehicle 110 by processing partial stationary lidar sensor 206 scans using TEDA to obtain moving objects 520 before the completion of a scan. Each column of lidar sensor point cloud data can be processed as soon as it is acquired, without waiting for further data acquisition. Foreground/background image 518 including moving objects 520 can be output 522 for further processing by server computer 120 or for transmission to computing device 115 of vehicle 110.

Figure 6:
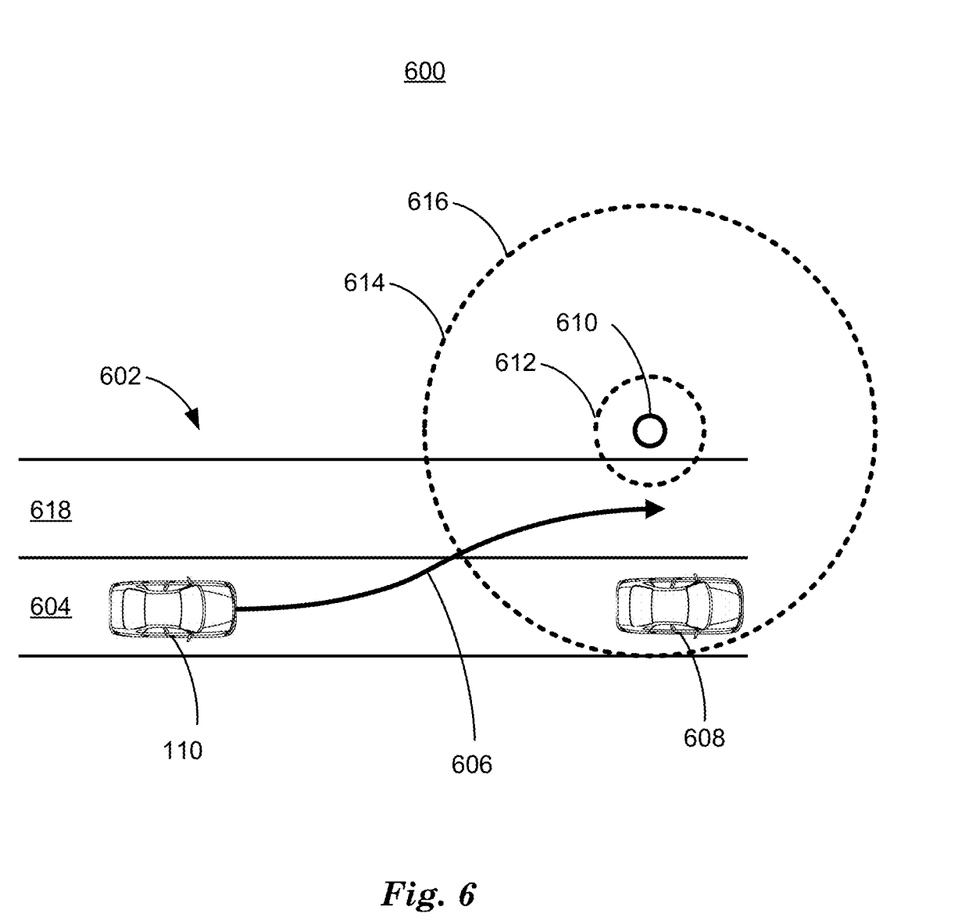
FIG. 6 is a diagram of an example vehicle cognitive map.

FIG. 6 is a diagram of an example cognitive map 600. A cognitive map 600 is a top-down view of an environment around a vehicle 110 and can be based on 2D map data like GOOGLE maps, for example, of an environment around a vehicle 110 downloaded to computing device 115 from a server computer 120. Cognitive map 600 includes a vehicle 110 traveling in a lane 604 on a roadway 602. Computing device 115 in vehicle 110 can operate vehicle 110 on a roadway 602 by determining a path polynomial 606. A path polynomial 606 is a vehicle path, as described above, wherein a third degree or less polynomial function evaluates to a vehicle vector, which is a vector that includes vehicle 3D pose as defined above in relation to FIG. 2, and acceleration with respect to each axis and rotation, with respect to a 3D coordinate system, for example latitude, longitude and altitude. Vehicle vectors can also include vehicle 2D location with respect to a roadway 602, vehicle speed, vehicle direction in 2D and vehicle lateral and longitudinal acceleration with respect to vehicle direction. Computing device 115 can determine path polynomial 606 by determining a current vehicle vector and a goal vehicle vector including a vehicle location, speed and direction, and calculating a polynomial function that includes estimated vehicle vectors for vehicle 110, calculated to maintain minimum and maximum limits of lateral and longitudinal accelerations.

Computing device 115 can use cognitive map 600 to operate vehicle 110 on a roadway 602 by using sensors 116, including GPS and accelerometer-based inertial navigation systems (INS), for example, to determine a location of vehicle 110 with respect to the cognitive map 600 and using sensors 116 including video, lidar and radar sensors, for example, to determine location, speed and direction for another vehicle 608. Computing device 115 can also use information regarding moving objects 520 received from server computer 120 included in a traffic infrastructure system 100. Traffic infrastructure system 100 can include a stationary lidar sensor 610, having a field of view 616 between inner diameter 612 and outer diameter 614. Traffic infrastructure system 100 can transmit moving object information 520 acquired by stationary lidar sensor 610 and information regarding the location of stationary lidar sensor 610 and the location of field of view 616. By combining moving object information 520 from foreground/background image 518 with information regarding the location of stationary lidar sensor 610 and field of view 614, computing device can accurately project moving object information 520 from foreground/background image onto cognitive map 600.

Projecting moving object information 520 from foreground/background image onto cognitive map 600 can permit computing device 115 to correlate moving objects detected based on vehicle sensors 116 with moving object information 520 detected in stationary lidar point cloud data 502, thereby improving moving object detection. Moving object information 520 detected in stationary lidar point cloud data 502 can also supplement moving objects detected by vehicle sensors 116, in examples where roadway geometry like curves and corners, or other vehicles can obscure a clear view of moving objects. Moving object information 520 can also be detected beyond the range of vehicle sensors 116. Operating a vehicle 110 on a roadway can be improved by receiving stationary lidar point cloud data processed by a traffic information system 100 server computer 120 to include moving object information 520.

Projecting moving object information 520 onto cognitive map 600 can permit computing device 115 to determine locations for the moving object information 520 in cognitive map 600 and thereby determine a path polynomial 606 that permits vehicle 110 to maintain vehicle speed, for example, while avoiding another vehicle 608, where other vehicle 608 was detected as a moving object information 520 in a foreground/background image 518 received by computing device 115 from a stationary lidar sensor 206, 610 via a traffic infrastructure system 100 server computer 120. In this example computing device 115 can determine a path polynomial 606 corresponding to a lane change maneuver, where vehicle 110 will travel from a current lane 604 to an adjacent lane 618 to avoid collision or near collision with another vehicle 608.

Figure 7:
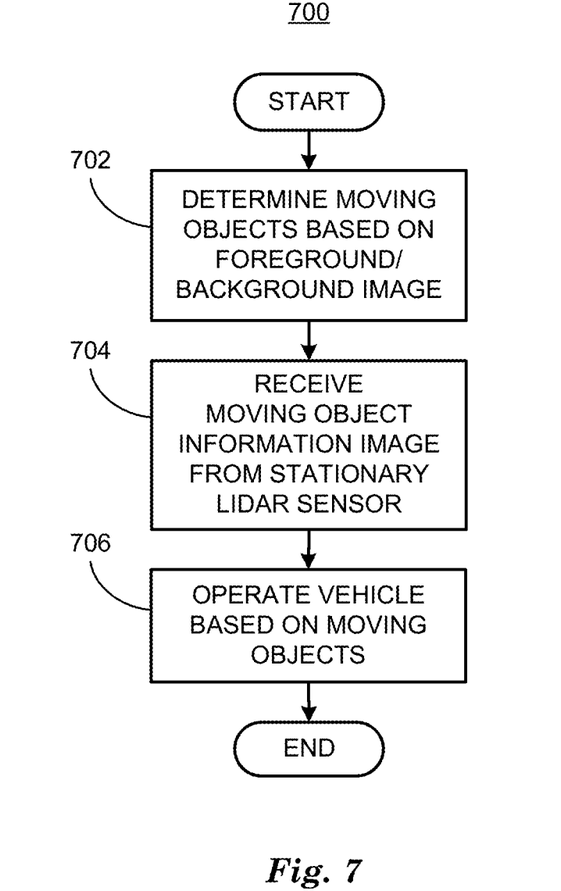
FIG. 7 is a flowchart diagram of an example process to operate a vehicle based on stationary lidar sensor data.

FIG. 7 is a diagram of a flowchart, described in relation to FIGS. 1-6, of a process 700 for operating a vehicle based on receiving moving object information, wherein the moving object information is generated by processing stationary lidar data using TEDA. Process 700 can be implemented by a processor of computing device 115, taking as input information from sensors 116, and executing commands and sending control signals via controllers 112, 113, 114, for example. Process 700 includes multiple blocks taken in the disclosed order. Process 700 also includes implementations including fewer blocks or can include the blocks taken in different orders.

Process 700 begins at block 702, in which a server computer 120 can receive lidar sensor point cloud data from a stationary lidar sensor 206, 610. Stationary lidar sensor 206, 610 can determine foreground/background image 518 from lidar sensor point cloud data as discussed in relation to FIG. 5, above. A server computer can also receive real world 3D pose data from stationary lidar sensor 206, 610 as discussed above in relation to FIG. 2.

At block 704 computing device 115 in vehicle 110 receives moving object information 520 based on the foreground/background image 518 and the real world 3D pose data received at block 702. Computing device 115 can determine moving objects 520 by combining the real world 3D pose data and information regarding the location in pixel coordinates of the moving object information 520 in foreground/background image 518 to project the moving object information 520 onto a cognitive map 600 and thereby determine the location of the moving object information 520 in cognitive map 600. As discussed in relation to FIG. 6, above, moving object information 520 can be determined by a traffic information system 100 server computer 120 based on lidar sensor data from stationary lidar sensor 206, 610 and transmitted to computing device 115 via a traffic infrastructure system 100 and added to cognitive map 600, even though the moving objects 520 might not be in the fields of view of sensors 116 included in vehicle 110, and therefore visible to vehicle 110.

At block 706 computing device 115 operates vehicle 110 based on moving object information 520 located in cognitive map 600 a other vehicle 608. Computing device 115 can operate vehicle 110 based on a path polynomial 606 as discussed in relation to FIG. 6, above. Path polynomial 606 can be determined, in part, based on the location of another vehicle 608 based on moving object information 520 downloaded from a server computer 120 in a traffic information system 100. The moving object information 520 is generated from lidar sensor data acquired from a stationary lidar sensor 206, 610 and processed with a server computer 120 in a traffic infrastructure system 100. The downloaded moving object information 520 can be identified as another vehicle 608 by computing device 115 based on the location, size and movement of the moving object information 520 and located in cognitive map 600. Following block 706 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
receiving, in a vehicle, moving object data determined by processing lidar sensor data acquired by a stationary lidar sensor performing a scan of a field of view, and processed using typicality and eccentricity data analysis (TEDA), wherein the stationary lidar sensor acquires lidar sensor data in a sequence of columns from left to right and transmits the lidar sensor data to a traffic infrastructure computing device which processes the columns of lidar sensor data in an order of the sequence in which they are acquired to determine the moving object data, wherein a portion of the lidar sensor data including the moving object data is received in the vehicle before the stationary lidar sensor has completed the scan of the field of view; and
operating the vehicle based on the moving object data.

2. The method of claim 1, wherein TEDA includes processing the stationary lidar sensor data to determine a pixel mean and a pixel variance over a moving time window and combining current pixel values with pixel mean and pixel variance to determine foreground pixels based on eccentricity.

3. The method of claim 2, wherein determining moving object information is based on determining connected regions of foreground pixels in a foreground/background image formed by TEDA.

4. The method of claim 3, wherein determining moving object information in the foreground/background image includes tracking connected regions of foreground pixels in a plurality of foreground/background images.

5. The method of claim 4, wherein moving object information is projected onto a map centered on the vehicle based on a 3D lidar sensor pose and lidar sensor field of view and a 3D vehicle pose.

6. The method of claim 5, wherein operating the vehicle includes determining a polynomial function that includes predicted vehicle trajectories, wherein predicted vehicle trajectories include location, direction, speed, and lateral and longitudinal accelerations.

7. The method of claim 6, wherein determining the polynomial function includes determining a destination location on the map.

8. The method of claim 7, wherein determining the polynomial function includes avoiding collisions or near-collisions with moving objects.

9. A system, comprising a processor; and a memory, the memory including instructions to be executed by the processor to:
receive, in a vehicle, moving object data determined by processing lidar sensor data acquired by a stationary lidar sensor performing a scan of a field of view, and processed using typicality and eccentricity data analysis (TEDA), wherein the stationary lidar sensor acquires lidar sensor data in a sequence of columns from left to right and transmits the lidar sensor data to a traffic infrastructure computing device which processes the columns of lidar sensor data in an order of the sequence in which they are acquired to determine the moving object data, wherein a portion of the lidar sensor data including the moving object data is received in the vehicle before the stationary lidar sensor has completed the scan of the field of view; and operate the vehicle based on the moving object information.

10. The system of claim 9, wherein TEDA includes processing the stationary lidar sensor data to determine a pixel mean and a pixel variance over a moving time window and combining current pixel values with pixel mean and pixel variance to determine eccentricity.

11. The system of claim 9, wherein determining moving object information is based on determining connected regions of foreground pixels in a foreground/background image formed by TEDA.

12. The system of claim 11, wherein determining moving object information in the foreground/background image includes tracking connected regions of foreground pixels in a plurality of foreground/background images.

13. The system of claim 12, wherein moving object information is projected onto a map centered on the vehicle based on a 3D lidar sensor pose and lidar sensor field of view and a 3D vehicle pose.

14. The system of claim 13, wherein operating the vehicle includes determining a polynomial function on the map that includes predicted vehicle trajectories, wherein predicted vehicle trajectories include location, direction, speed, and lateral and longitudinal accelerations.

15. The system of claim 14, wherein determining the polynomial function includes determining a destination location on the map.

16. The system of claim 15, wherein determining the polynomial function includes avoiding collisions or near-collisions with moving objects.

17. A system, comprising:
means for controlling vehicle steering, braking and powertrain; and
computer means for:
receiving, in a vehicle, moving object data determined by processing lidar sensor data acquired by a stationary lidar sensor performing a scan of a field of view, and processed using typicality and eccentricity data analysis (TEDA), wherein the stationary lidar sensor acquires lidar sensor data in a sequence of columns from left to right and transmits the lidar sensor data to a traffic infrastructure computing device which processes the columns of lidar sensor data in an order of the sequence in which they are acquired to determine the moving object data, wherein a portions of the lidar sensor data including the moving object data is received in the vehicle before the stationary lidar sensor has completed the scan of the field of view; and
means for operating the vehicle based on the moving object information and the means for controlling steering, braking and powertrain.

18. The system of claim 9, wherein the sequential columns of lidar sensor data are included in a field of view and portions of the lidar sensor data including the moving object information are received in the vehicle before the stationary lidar sensor has completed acquiring the field of view.

19. The system of claim 9, wherein an empirically determined constant learning rate is used to assign an exponentially decreasing weights to the pixels of the lidar sensor data.

20. The system of claim 9, wherein operating the vehicle is based on a cognitive map of the environment determined based on moving object information.

* * * * *

UNITED STATES PATENT AND TRADEMARK OFFICE
CERTIFICATE OF CORRECTION

| | |
|---|---|
| PATENT NO. | : 11,783,707 B2 |
| APPLICATION NO. | : 16/155048 |
| DATED | : October 10, 2023 |
| INVENTOR(S) | : Mostafa Parchami et al. |

It is certified that error appears in the above-identified patent and that said Letters Patent is hereby corrected as shown below:

In the Claims

Column 14, Line 16, Claim 17: Change "portions" to --portion--.

Signed and Sealed this
Seventh Day of November, 2023

*Katherine Kelly Vidal*

Katherine Kelly Vidal
*Director of the United States Patent and Trademark Office*